NANCY PATTON, OF KANSAS, ILLINOIS.

Letters Patent No. 85,328, dated December 29, 1868.

IMPROVED COMPOSITION FOR PRESERVING EGGS.

The Schedule referred to in these Letters Patent and making part of the same.

*To all whom it may concern:*

Be it known that I, NANCY PATTON, of Kansas, in the county of Edgar, and State of Illinois, have invented a new and useful Composition for Preserving Eggs; and I do hereby declare the following to be a full, clear, and exact description of the manner of compounding and using the same.

Eggs are of rapid decomposition, especially in warm weather and climates, and various efforts have been made to preserve them and render them merchantable in all seasons. The porous formation of the shell of an egg admits of the free absorption of oxygen, and this produces the decomposition. To preserve eggs by soaking them in a chemical solution does not answer the purpose, because more or less of the solution penetrates the inner membrane and destroys the flavor.

The composition which I have invented and successfully used, in preserving eggs for a period of twelve months, is a fine, dry powder, and the articles and their proportions, for preserving an ordinary tubful, consist of, viz:

Bituminous stone-coal, eight pounds; charcoal, eight pounds. These are pulverized very fine, and put into a vessel or tub. Eight pounds of leached ashes and twenty-four pounds of lime are then sifted into the vessel, and twelve pounds of common salt added, and the whole well mixed together. Three ounces of saltpetre, six ounces of alum, eight ounces of borax, eight ounces of cream tartar, and ten ounces of soda are then put into a kettle with about a gallon of soft water, and these are boiled until all are dissolved. This mixture is then poured in with the dry mixture, and the whole stirred up so as to intermix them thoroughly.

The object of boiling the saltpetre, alum, borax, cream tartar, and soda, is to obviate the necessity of dissolving them in water, and enable me to use them as a dry mixture, which I have found far preferable to a solution. This is one of the essential features of my preserving-composition, because by it I produce a dry mixture of preserving-articles, which, to some extent, has only been produced in a liquid form.

I am aware that a dry packing, of bran, salt, and lime, has been used for preserving eggs, but this mixture, while it answers a good purpose for packing, fails in preserving the eggs, because it lacks the necessary quality of rendering the shell, when exposed, impervious to air.

A coating of gum and acids formed upon the shell not only renders the egg unmarketable, but the solution penetrates the inner membrane, and destroys the flavor of the egg. But the dry mixture which I have made forms a powder to thicken and fill the pores of the shell, to preserve, sweeten, and render cool the entire body of the egg. And this process is effected mainly by the suction of the egg itself, which, being a liquid, embedded in a fine, dry powder, and separated only by a porous shell, draws the preserving-powder into the cells of the shell, and fills them, thereby rendering them comparatively thick and solid, while the contact of the particles of the composition with the membrane next the shell sweetens the egg, and more effectually preserves it, without affecting, in the slightest manner, the animal life of the egg.

The ashes are leached in order to prevent the raw potash which they contain from eating the shell of the egg.

After the composition is made, it should stand about twenty-four hours, when the mixture, thus compounded and prepared, is sifted before being used, in order to free it from lumps, so that it will pack closely round the eggs.

In packing the eggs, it is necessary that they should be fresh and clean, and the composition should be so disposed, in the vessel in which they are packed, as to completely surround every one; and they may be packed without regard to position. The eggs remain packed in the composition about four days, when they may be removed and packed in bran for the market, and the composition used for another lot of eggs. In this way barrels of eggs may be preserved and shipped to distant markets, by using the same composition.

I claim the dry composition, compounded and prepared as herein described, for preserving eggs.

In testimony whereof, I have signed my name.

NANCY PATTON.

Witnesses:
EUGEEN GARDNER,
WM. TIMSLAY.